(12) United States Patent
Dean

(10) Patent No.: US 8,331,733 B2
(45) Date of Patent: Dec. 11, 2012

(54) METHOD AND SYSTEM FOR SIGNAL PROCESING NON-UNIFORMLY SAMPLED DATA

(75) Inventor: Bruce H. Dean, New Market, MD (US)

(73) Assignee: The United States of America as represented by the Administrator of the National Aeronautics by and Space Administration, Washington, DC (US)

( * ) Notice: Subject to any disclaimer, the term of this patent is extended or adjusted under 35 U.S.C. 154(b) by 663 days.

(21) Appl. No.: 12/550,141

(22) Filed: Aug. 28, 2009

(65) Prior Publication Data

US 2011/0051990 A1    Mar. 3, 2011

(51) Int. Cl.
*G06K 9/36* (2006.01)
*G06K 9/32* (2006.01)
*G06K 9/00* (2006.01)

(52) U.S. Cl. ...................................... 382/300
(58) Field of Classification Search .......... None
See application file for complete search history.

(56) References Cited

U.S. PATENT DOCUMENTS

| | | | |
|---|---|---|---|
| 7,602,997 B2 * | 10/2009 | Young | 382/299 |
| 2007/0064976 A1 * | 3/2007 | England | 382/106 |
| 2008/0212176 A1 * | 9/2008 | Baun et al. | 359/429 |

OTHER PUBLICATIONS

H. G. Feichtinger, K. Gr\öchenig, and T. Str\öhmer, "Efficient numerical methods in non-uniform sampling theory", Numerische Mathematik, vol. 69, No. 4, pp. 423-440 , 1995.*

* cited by examiner

*Primary Examiner* — Atiba O Fitzpatrick
*Assistant Examiner* — Thomas A James

(57) ABSTRACT

According to various embodiments, a method is provided for improving data and a system is provided that is configured to perform the method. The method can comprise processing a data signal by using an optical system comprising a signal processor. The method can comprise collecting data generated by the optical system, wherein the data comprises non-uniformly sampled data. The method can comprise performing an interpolation operation on the non-uniformly sampled data using the signal processor, to generate interpolated data. Further, the method can comprise adjusting the data with the interpolated data using the signal processor, to generate improved data. The improved data can be output to a user, for example, by displaying the improved data on a display unit, or by printing out the improved data. According to various embodiments, the data can comprise any desired data, for example, image data. The method can comprise improving the image resolution, improving the image brightness, improving the image contrast, and/or improving the image focus.

11 Claims, 3 Drawing Sheets

METHOD AND SYSTEM FOR SIGNAL PROCESING NON-UNIFORMLY SAMPLED DATA

STATEMENT OF GOVERNMENT INTEREST

The invention described herein was made by an employee of the United States Government and may be manufactured and used by or for the Government of the United States of America for governmental purposes without the payment of any royalties thereon or therefor.

FIELD

The present invention relates generally to digital signal processing, and more particularly to a more effective manner to interpolate data from non-uniformly sampled data.

BACKGROUND

In the field of signal processing methods are commonly used to transform data between different domains, for example, from the time domain to the frequency domain. One such equation that can be used to transform data is the Whittaker-Shannon-Kotelnikov ("WSK") sampling theorem. The theorem describes two processes in signal processing, a sampling process in which a continuous time signal is converted into a discrete time signal, and a reconstruction process in which the original continuous time signal is recovered from the discrete signal. Reconstruction of the original continuous time signal is an interpolation process that mathematically defines a continuous-time signal from the discrete samples and times between the sample instants. During the interpolation process, unknown data values are approximated from surrounding known data values.

The WSK sampling theorem corresponds to Nyquist sampled data. The WSK sampling theorem provides a method for reconstructing a continuous time band-limited function from a discrete set of data points. The WSK sampling theorem assumes constant intervals between the data points. In other words, the theorem assumes a uniform data signal. Such a theorem is disadvantageous, however, when there is a need to reconstruct a non-uniform data signal. A need exists to overcome this deficiency.

SUMMARY

According to various embodiments, a method for interpolating non-uniformly sampled data is provided. The interpolated data can be used to improve the original data. The method can comprise providing an optical system comprising a signal processor. The method can comprise collecting data generated by the optical system, wherein the data comprises non-uniformly sampled data. The method can comprise performing an interpolation operation on the non-uniformly sampled data using the signal processor, to generate interpolated data. Further, the method can comprise adjusting the data with the interpolated data using the signal processor, to generate improved data. The improved data can be output to a user, for example, by displaying the improved data on a display unit, by printing the improved data, by adjusting an image based on the improved data, or a combination thereof. According to various embodiments, the data can comprise any desired data, for example, image data. The method can comprise improving the image data. For example, the method can comprise improving the image resolution, the image brightness, the image contrast, and/or the image focus.

According to various embodiments, the interpolation operation can transform the data from one domain to another. For example, the data can be transformed from the spatial domain to the frequency domain or from the frequency domain to the spatial domain. In some embodiments, the interpolation operation can comprise transforming the non-uniformly sampled data from the spatial domain to the frequency domain by applying the function $$f(x) = \frac{2}{Q} \sum_{n=-\infty}^{+\infty} f(x_n) \operatorname{sinc}\left[\frac{2}{Q}\left(n - \frac{x}{\Delta x}\right)\right]$$

to the non-uniformly sampled data, wherein $f(x)$ is a sampled periodic function, Q is a dimensionless constant for the ratio of a sampling frequency to a band-limited frequency, n is the sampling interval, $$\sum_{n=-\infty}^{+\infty}$$

is the summation from positive infinity to negative infinity, and $f(x)_n$ is the value of the periodic function at the sampling interval n.

In some embodiments, the interpolation operation can comprise transforming the non-uniformly sampled data from the frequency domain to the spatial domain by applying the function $$F(v) = \frac{2}{Q_v} \sum_{n=-\infty}^{+\infty} F(v_n) \operatorname{sinc}\left[\frac{2}{Q_v}\left(n - \frac{v}{\Delta v}\right)\right]$$

to the non-uniformly sampled data, wherein F(v) is Fourier transform, $Q_v$ is a dimensionless constant for the ratio of a sampling interval to a spatial limit, n is the sampling interval, $$\sum_{n=-\infty}^{+\infty}$$

is the summation from positive infinity to negative infinity, and $F(v_n)$ is the value of the Fourier transform at the sampling interval n.

According to various embodiments, the present teachings provide an optical system that can be configured to perform the method of the present teachings. The optical system can comprise a signal processor and a control unit, wherein the control unit is operably linked to the signal processor. The signal processor can be configured to perform the method described herein. The signal processor can be configured to collect image data from the telescope. The image data can comprise at least one of resolution data, contrast data, brightness data, and focus data.

BRIEF DESCRIPTION OF THE DRAWINGS

The present teachings will be described with reference to the accompanying drawings.

DETAILED DESCRIPTION OF THE PRESENT INVENTION

Figure 1:
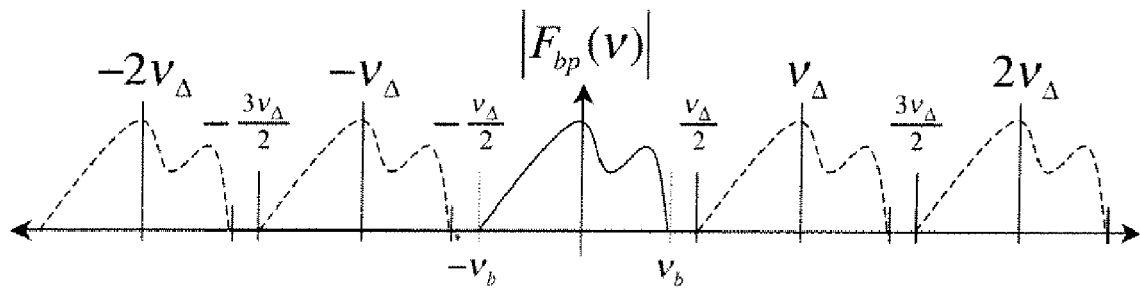
FIG. 1 illustrates a Fourier transform of a band-limited sampled function and its representation by periodic extension of the sampling interval, according to various embodiments of the present teachings.

According to various embodiments, the Whittaker-Shannon-Kotelnikov (WSK) sampling theorem can be used as a starting point for reconstructing a continuous band-limited function from a discrete set of sample points. Various references describe the WSK sampling theorem, for example, E. T. Whittaker, "On the Functions which are Represented by the Expansions of the Interpolation Theory," Proc. Royal Soc. Edinburgh, Sec. A, Vol. 35, pp. 181-194 (1915), C. E. Shannon, "Communication in the presence of noise," Proc. Institute of Radio Engineers, vol. 37 (1), pp. 10-21 (1949), V. A. Kotelnikov, "On the capacity of the 'either' and of cables in electrical communication." Procs. Of the $1^{st}$ All-Union Conference on technological reconstruction of the communications sector and low-current engineering, Moscow (1933), A. J. Jerri, "The Shannon Sampling Theorem—Its Various Extensions and Applications: A Tutorial review," IEEE Comm., Vol. 65 (11), pp. 1565-1596 (1977), H. D. Luke, "The origins of the sampling theorem," IEEE comm., Vol. 37 (4), pp. 106-108 (1999), and M. Unser, "Sampling—50 Years After Shannon," IEEE Comm., Vol. 99 (4), pp. 569-587, all of which are incorporated herein in their entireties by reference. The result can be derived using a convolution theorem in combination with various mathematical computing software, for example, the comb(x) and rect(x) functions of MATLAB®, available from Mathworks Inc., Natick, Mass. The sampling theorem can be used to sample optical fields as described in J. W. Goodman, Introduction to Fourier Optics, $2^{nd}$ ed. (McGraw Hill, New York, N.Y., 1996), pp. 23-26, and D. A. Aronstein, "Whittacker-Shannon Interpolation of Electric Fields and Point-Spread Functions," private communication (Apr. 6, 2007), both of which are incorporated herein in their entireties by reference.

As is known in the art, the WSK sampling theorem assumes a continuous uniformly sampled data signal. Because of this, the WSK sampling theorem is not ideal for use with a non-uniformly sampled data signal. Described herein is a derivation of the sampling theorem that emphasizes two assumptions of the theorem explicitly. This derivation achieves a preferred method for interpolating non-uniformly sampled data signals. The theorem can be expressed in terms of two fundamental length scales that are derived from these assumptions. The result can be more general than what is usually reported and contains the WSK form as a special case corresponding to Nyquist sampled data. In some embodiments, the preferred basis set for interpolation can be found by varying the frequency component of the basis functions in an optimal way. This observation can give a generalization of the WSK result to situations where the data-sampling interval is non-uniform, for example, as is described J. L. Yen, "On nonuniform sampling of band limited signals," IRE Trans. Circ. Theory CT-3, 251-257 (1956), which is incorporated herein in its entirety by reference.

According to various embodiments, a method for interpolating non-uniformly sampled data is provided. The interpolated data can be used to improve original data. The method can comprise providing an optical system comprising a signal processor. The method can comprise collecting data generated by the optical system, wherein the data comprises non-uniformly sampled data. The method can comprise performing an interpolation operation on the non-uniformly sampled data using the signal processor, to generate interpolated data. In some embodiments, the method can comprise adjusting the data with the interpolated data using the signal processor, to generate improved data. The improved data can be output to a user, for example, by displaying the improved data on a display unit, by printing the improved data, by adjusting an image based on the improved data, by a combination thereof, or the like. According to various embodiments, the data can comprise any desired data, for example, image data. The method can comprise improving the image data. For example, the method can comprise improving the image resolution, the image brightness, the image contrast, and/or the image focus.

According to various embodiments, the interpolation operation can transform the data from one domain to another. For example, the data can be transformed from the spatial domain to the frequency domain or from the frequency domain to the spatial domain. The present teachings also provide an optical system that can be configured to perform the method of the present teachings. The optical system can comprise a signal processor and a control unit, where the control unit is operably linked to the signal processor. The signal processor can be configured to perform the method described herein. In some embodiments, the signal processor can be configured to collect image data from a telescope. The image data can comprise at least one of resolution data, contrast data, brightness data, and focus data.

Assumptions: Band-limited Functions and Sampling Interval

According to various embodiments, the Fourier transform can be defined as:

$$F(v) \equiv \Im\{f(x)\} = \int_{-\infty}^{+\infty} dx f(x) e^{-i2\pi vx}$$

and its inverse can be represented as:

$$f(x) = \Im^{-1}\{F(v)\} = \int_{-\infty}^{+\infty} dv F(v) e^{i2\pi xv}$$

The sampling theorem can be based on three conditions (A, B, and C) regarding the Fourier transform. The conditions A, B, and C can be:

(A) F(v) can be non-zero over a finite domain, or alternatively stated, its conjugate function $f(x)$ can be band-limited:

$$F_b(v) = \Im\{f(x)\} = 0 \text{ for } v \notin [-v_b, v_b]$$

with $|v_b| < \infty$.

(B) A periodic function $F_{bp}(v)$ can be constructed from $F_b(v)$ by periodic extension over the data-sampling interval $\Delta x$:

$$F_{bp}(v) = F_b(v + nv_\Delta); \text{ for } \forall v \in \degree \text{ and } n = 0, 1, 2, \ldots$$

where $v_\Delta = 1/\Delta x$ is the data sampling frequency. In some embodiments, condition (A) can imply condition (B) because a periodic function can be constructed from the $F_b(v)$. Therefore, in some embodiments, condition (B) can be implied by (A).

(C) Finally, existence of $F_b(v)$ can be implied by $$\int_{-\infty}^{+\infty} dx |f(x)| < \infty$$

or in the discrete case: $f_n \equiv f(x_n) = f(n\Delta x)$

According to various embodiments, the band-limited functions shown in condition (A) and condition (B) can imply two fundamental length scales $x_b = 1/v_b$ and $\Delta x = 1/v_\Delta$ where $x_n = n\Delta x$ are the data sample points. These length scales, or equivalently their associated frequency intervals, can be kept independent and play a fundamental role in the derivation of the sampling theorem. According to various embodiments, condition (C) does not hold for periodic functions, for example, sin(x). To overcome this, the generalized Fourier transform for functions of "slow growth" can be used. Discussion on the generalized Fourier transform can be found in H. P. Hsu, Applied Fourier Analysis, (Harcourt Brace, New York, N.Y., 1984), pp. 98, 104, which is incorporated herein in its entirety by reference. Parseval's theorem can be used to construct the Fourier transform for functions not satisfying condition (C).

According to various embodiments, FIG. 1 illustrates the band-limited condition (A) and condition (B) in the frequency domain. In FIG. 1, the Fourier transform of a band-limited sampled function is represented by periodic extension of the sampling interval. Alternatively, the $-v_b$ ordinate of FIG. 1 can be shifted to the origin as in FIG. 2. This version of the band-limited sampled function further illustrates the construction of condition (B), by periodic extension over the sampling frequency $v_\Delta$.

Derivation of the Sampling Theorem

Figure 2:
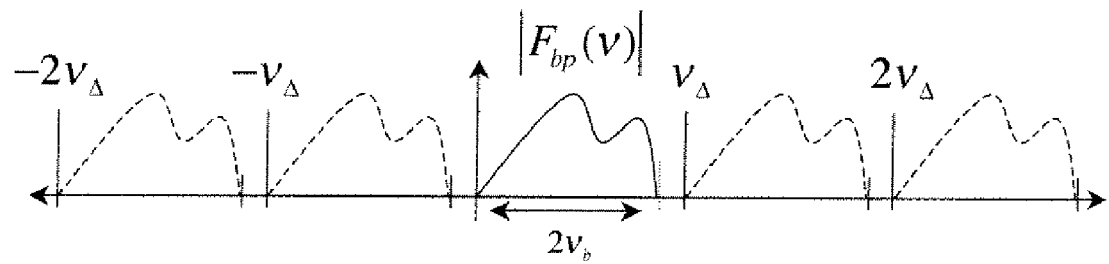
FIG. 2 illustrates the Fourier transform of FIG. 1 with the sampling ordinate $(-v_b)$ shifted to the origin, according to various embodiments of the present teachings.

As shown in FIG. 2, condition (B) allows the Fourier transform to be constructed as a periodic function by periodic extension of the sampling frequency. Condition (B) does not have to be taken as a fundamental property of the sampled Fourier transform, but can be enforced by construction, for example, as:

$$F_{bp}(v) = \sum_{n=-\infty}^{+\infty} c_n e^{-i2\pi v n(1/v_\Delta)} \equiv \sum_{n=-\infty}^{+\infty} c_n e^{i2\pi v n(n\Delta x)}.$$

From condition (A), $F_b(v) = F_{bp}(v)$ over $\pm v_b$, thus $f(x)$ can be expressed as:

$$f(x) = \int_{-v_b}^{+v_b} dv F_b(v) e^{i2\pi v x}$$

By this interpretation, condition (B) allows for a representation of $f(x)$ as a sampled, but not necessarily periodic, function $f(x_n)$. When representing $F_{bp}(v)$ in a Fourier sense, as shown in FIG. 2, the Nyquist condition can be enforced, for example, $v_\Delta = 2v_b \Rightarrow \Delta x = \tfrac{1}{2}v_b$. Examples of the Nyquist condition are described in R. W. Hamming, Digital Filters, (3$^{rd}$ Edn, Dover, Mileola, N.Y., 1998). P. 174, and H. Nyquist, "Certain topics in telegraph transmission theory," Trans. AIEE, vol. 47, pp. 617-644 (1928), both of which are incorporated herein in their entireties by reference. The derivation does not assume a relationship between $\Delta x$ and $v_b$, other than $v_\Delta \geq v_b$, thus, $\Delta x$ and $v_b$ can be kept independent. Substituting $$F_{bp}(v) = \sum_{n=-\infty}^{+\infty} c_n e^{-i2\pi v n(1/v_\Delta)} \equiv \sum_{n=-\infty}^{+\infty} c_n e^{i2\pi v n(n\Delta x)}$$

into $f(x) = \int_{-v_b}^{+v_b} dv F_b(v) e^{i2\pi v x}$, and then interchanging the order of summation and integration gives:

$$f(x) = \sum_{n=-\infty}^{+\infty} c_n \int_{-V_b}^{+V_b} dv e^{i2\pi v(x-n\Delta x)}.$$

According to various embodiments, $f(x)$ can be evaluated:

$$f(x) = 2v_b \sum_{n=-\infty}^{+\infty} c_n \frac{\sin[2\pi v_b(x_n - x)]}{2\pi v_b(x_n - x)}$$

$$= 2v_b \sum_{n=-\infty}^{+\infty} c_n \mathrm{sinc}[2v_b(x_n - x)]$$

where the right hand side can be expressed using the definition of the sin c(x) function:

$$\sin c(x) \equiv \sin(\pi x)/\pi x$$

Solving for the $c_n$ in terms of the sampled function values of $f(x_n)$ $$c_n = f(n\Delta x)/v_\Delta = f(x_n)/v_\Delta$$

and then substituting this value for $c_n$ into the integral we get the derivation of the sampling theorem in the spatial domain, which can be represented as:

$$f(x) = \frac{2}{Q} \sum_{n=-\infty}^{+\infty} f(x_n) \mathrm{sinc}\left[\frac{2}{Q}\left(n - \frac{x}{\Delta x}\right)\right].$$

The dimensionless constant Q can be substituted for the ratio of the sampling frequency to the band-limited frequency:

$$Q \equiv \frac{v_\Delta}{v_b}$$

Using this substitution, the derivation can be expressed as:

$$f(x) = 2\Delta x v_b \sum_{n=-\infty}^{+\infty} f(x_n) \mathrm{sinc}[2v_b(x_n - x)]$$

According to various embodiments, the derivation of the sampling theorem in the spatial domain can provide a method for reconstructing a continuous band-limited function in terms of the frequency bandwidth $v_b$ and the sampling interval $\Delta x$. As illustrated in FIGS. 1 and 2 the derivation is valid when:

$$Q \geq 2 \Rightarrow \Delta x \leq \frac{1}{2v_b}$$

recognizing Q=2 as the Nyquist condition that can be used to avoid aliasing. Substituting the Nyquist condition into the derivation can illustrated that the WSK result can be a special case of the derivation of the sampling theorem:

$$f(x)|_{Q \to 2} = \sum_{n=-\infty}^{+\infty} f(x_n) \mathrm{sinc}(n - x/\Delta x)$$

$$= \sum_{n=-\infty}^{+\infty} f(x_n) \mathrm{sinc}[v_\Delta(x_n - x)]$$

In the Frequency Domain

According to various embodiments, and as described above, the sampling theorem can be derived in the spatial domain by placing restrictions on a function's Fourier transform and can provide a method for reconstructing a continuous $f(x)$ from its sampled values, $f(x_n)$. In some embodiments, the modulus of the Fourier transform, $|F(v)|$, can be measured rather than the $f(x_n)$, so it is of equal interest to reconstruct $|F(v)|$ in the frequency domain, from its sampled values using a formula akin to the derivation of the sampling theorem in the spatial domain. Analogous with condition (A) for the spatial domain, $f(x)$ can be assumed to be spatially limited:

$$f_s(x) = 0 \text{ for } x \in [-x_s, x_s]$$

where $f_s(x)$ denotes a spatially limited version of $f(x)$. In some embodiments, $f(x)$ is not spatially limited, but $f_s(x)$ can be constructed using an appropriate filtering or windowing operation as described in H. J. Weaver, Applications of Discrete and Continuous Fourier Analysis, (Krieger Publishing Company, Malabar, Fl. 1992), pp. 134-147, which is incorporated herein in its entirety by reference.

In some embodiments, it is possible to construct a periodic function $f_{sp}(x)$ from $f_s(x)$ by periodic extension over the function spatial period $x_\Delta$, for example:

$$f_{sp}(x) = f(x + nx_\Delta), \text{ for } \forall x \in {}^\circ \text{ and } n = 0, 1, 2, \ldots$$

A spatially limited and periodic representation of f(x) can be represented by Fourier series as:

$$f_{sp}(x) = \sum_{n=-\infty}^{+\infty} b_n e^{i2\pi x n(1/x_\Delta)} \equiv \sum_{n=-\infty}^{+\infty} b_n e^{i2\pi x(n\Delta v)}$$

where $\Delta v = 1/x_\Delta$ is a data-sampling interval in the Fourier domain. The Fourier transform of the function can be defined as:

$$F(v) = \int_{-x_s}^{+x_s} dx f_{sp}(x) e^{-i2\pi v x}$$

and the Fourier sense can be substituted into the Fourier transform, while interchanging the order of summation and integration. The result can be expressed as:

$$F(v) = \sum_{n=-\infty}^{+\infty} b_n \int_{-x_s}^{+x_s} dx e^{i2\pi x(n\Delta v - v)}$$

Evaluating this result can be done as follows:

$$F(v) = \sum_{n=-\infty}^{+\infty} b_n (2x_s) \frac{\sin[2\pi x_s(n\Delta v - v)]}{2\pi x_s(n\Delta v - v)}$$

$$= \sum_{n=-\infty}^{+\infty} b_n(2x_s) \text{sinc}[2L_s(n\Delta v - v)]$$

where the right hand side can be expressed using the definition of the sin c(x) function. The variable $b_n$ can be expressed in terms of the sampled data values, for example:

$$b_n = F(v_n)/x_\Delta = F(n\Delta v)/x_\Delta.$$

Substituting $b_n$ into $F(v)$, and then rearranging terms, achieves a derivation of the sampling theorem in the frequency domain:

$$F(v) = \frac{2}{Q_v} \sum_{n=-\infty}^{+\infty} F(v_n) \text{sinc}\left[\frac{2}{Q_v}\left(n - \frac{v}{\Delta v}\right)\right]$$

where again a dimensionless constant $Q_v$ has been substituted for the ratio of the sampling interval to the spatial limit (the "v" subscript denotes the domain to which it applies):

$$Q_v \equiv \frac{x_s}{x_\Delta}$$

Alternatively, substituting in the value for $Q_v$, the derivation of the sampling theorem in the frequency domain can be expressed as:

$$F(v) = 2\Delta v x_s \sum_{n=-\infty}^{+\infty} F(v_n) \text{sinc}[2x_s(v_n - v)].$$

The derivations in the frequency domain are analogous to the derivations in the spatial domain, respectively, for reconstructing the Fourier transform of a spatially-limited function in terms of the function spatial limit $x_s$ and Fourier sampling interval $\Delta v$. Again, the derivation can be valid when:

$$Q_v \geq 2 \Rightarrow \Delta v \leq \frac{1}{2x_s}$$

corresponding to the Nyquist sampling condition.

Arbitrary Domain

Given the definition of the Fourier transfer and its inverse, it is possible to choose what is labeled as the "spatial (time)" or "Fourier (frequency)" domain. For example, the variables in either domain can arbitrarily be "x and v" or "v and x" as long as the variables are constant with the given choice and definitions of the Fourier transform and its inverse. Thus, the derivation of the sampling theorem in the frequency domain can be expected, but its derivation can be instructive in that the spatial limit $x_s$ can be seen as the corollary to the band-limit $v_b$, and the data sampling intervals, $\Delta x$ and $\Delta x$, can be the corollaries to their replicated periods, $v_\Delta$ and $X_\Delta$, in the conjugate domains, respectively.

Corollary Results

Several corollary results will be discussed in respect to the spatial domain. According to various embodiments, analogous expressions can be derived in the Fourier domain and in the arbitrary domain using the derivation of the sampling theorem described herein.

Continuous to Discrete, $x \rightarrow x_m a$

In some embodiments, an alternative statement of the hand-limited function $F_{bp}(v) = F_b(v + nv_\Delta)$ can be examined by considering the limit of the continuous variable "x" to the discrete case $x \rightarrow x_m$. In one example, the number of interpolation points can match the number of data samples. The sin c term in the sampling theorem derivation can then be represented as:

$$\sin c[2v_b(x_n - x)]|_{x \rightarrow x_m} = \sin c[2v_b(x_n - x_m)] = \sin c[2v_b \Delta x(n-m)]$$

and using the property of the Dirac delta function that $\delta(ax) = \delta(x)/|a|$, the limit can be represented as:

$$sinc[2v_b\Delta x(n-m)]|_{m\to n} = \frac{1}{2v_b\Delta x}\delta(n-m).$$

Substituting into the band-limited function and allowing the continuous variable x to become "discretized" to the same number of data samples as the function, the sin c(x) function interpolator can become the delta function:

$$f(x_m) = \sum_{n=-\infty}^{+\infty} f(x_n)\delta(n-m)$$

In some embodiments, the sin c(x) function interpolator can be an alternative statement of the main assumption of the band limited function of the periodicity of the Fourier transform. The Fourier transform of the sin c(x) function interpolator can lead to the band-limited function, which in fact can be a starting assumption when performing the derivation of the sampling theorem.

Windowing and the Discrete Form

According to various embodiments, the infinite sum in the sampling theorem can be substituted with a finite number of data samples N. The data can be windowed or truncated which can lead to spectral leakage in the spatial domain or aliasing in the Fourier domain. Spectral leakage and aliasing of signals can be an undesirable effect, otherwise known as Gibbs phenomena, which is described in H. Nyquist, "Certain topics in telegraph transmission theory," Trans. AIEE, vol. 47, pp. 617-644 (1928), which is incorporated herein in its entirety by reference. The method of the present teachings can be effective in overcoming or resolving the undesirable effects produced by the Gibbs phenomena.

Digital Representation

According to various embodiments, the numerical examples provided herein can use a finite representation such that for N data sample points the derivation of the sampling theorem can be represented as:

$$f(x) = (2/Q)\sum_{n=0}^{N-1} f(x_n)sinc[(2/Q)(n'(n) - x/\Delta x)]$$

where it is understood that $$n'(n) = \left[-\frac{1}{2}(N-1), \ldots, +\frac{1}{2}(N-1)\right]$$

can be the index range over N total points and can include values of x<0.$^g$. In some embodiments, n' (n) can be of a different index range, for example:

$$n'(n) = \left[-\frac{1}{2}N, \ldots, +\frac{1}{2}(N-1)\right].$$

Where n'(n)=[−½ (N−1), . . . , +½(N−1)], the index range can comprise one or more of the following qualities:
 (a) the range can be symmetric with respect to the interval endpoints,
 (b) when N is odd, the range can include the origin n'=0,
 (c) when N is odd, the n' can be integer valued,
 (d) when N is odd, there can be an even number of "pixels."
 According to various embodiments, the continuous variable x (the interpolation points) can be finite, for example, there can be M total interpolation points. In some embodiments, M>N, M=N, or M<N. The digital sampling interval for interpolation, $\Delta x'$, can be represented as a fraction of the data sampling interval $\Delta x'$, for example, $$\Delta x' = x/J,$$

where J≥1. Therefore, for a given choice of f there will be:

$$M = J(N-1)+1,$$

interpolation points for x, and thus by analogy with the finite representation, we can specify a free index for the interpolation points:

$$m \in \left[-\frac{1}{2}(M-1), \ldots, +\frac{1}{2}(M-1)\right] = \left[-\frac{1}{2}J(N-1), \ldots, +\frac{1}{2}J(N-1)\right]$$

noting that if N is odd then M will also be odd for integer-valued J. Considering the sin c(x) basis function, we can determine:

$$\left(n' - \frac{x}{\Delta x}\right) \to \left[n' - \left(\frac{m\Delta x}{J}\right)\frac{1}{\Delta x}\right] = n' - \frac{m}{J}$$

and so the derivation of the sampling theorem in the spatial domain can be expressed in discrete form as:

$$f(x'_m \equiv m\Delta x') = (2/Q)\sum_{n=0}^{N-1} f(x_n)sinc[(2/Q)(n' - m/J)]$$

giving a computable realization for the m-th interpolated value of $f(x)$. The discrete form of the WSK result can be represented as:

$$f(x'_m \equiv m\Delta x')|_{Q\to 2} = \sum_{n=0}^{N-1} f(x_n)sinc(n' - m/J).$$

In some embodiments, the number of interpolation points can match the number of data points that are sampled. For example, when J=1, the finite sum can be represented as:

$$f(x_m) = \sum_{n=0}^{N-1} f(x_n)\delta(n-m)$$

Convolution Form

As mentioned above, the sampling theorem in the spatial domain can provide a method for reconstructing a band-limited function in terms of the fundamental length scales: $v_h$ and $\Delta x$. $f(x)$ can be expressed as a weighted sum over the sin c(x) basis functions. In some embodiments, in the continuum limit, the band-limited function can become a convolution integral:

$$f(x) = f(x) \otimes \sin c(x) = \int_{-\infty}^{+\infty} du f(u) \sin c(x-u)$$

The convolution integral can be viewed as an implication of the assumptions in conditions A, B, and C. In continuum form, the implications of these assumptions can be examined for additional insight into their analytic structure. The continuum limit of the delta function can be represented as:

$$f(x) = f(x) \otimes \delta(x) = \int_{-\infty}^{+\infty} du f(u)\delta(x-u)$$

To further emphasize the convolution form, the Fourier transform of the convolution integral can show that in the frequency domain the integral can be used to force a finite interval on the Fourier transform of the function, and thus a band-limit on $f(x)$:

$$\Im\{f(x)\}=F_b(v)=F(v)\cdot rect(v,2v_b)$$

According to various embodiments, the convolution integral can be a reincarnation of the band-limited assumption and the Fourier transform of the convolution integral can be the Fourier domain representation of condition (A). Algebraic examples of the convolution integral can be, for example $f(x)=\sin c(x)$, which can be represented as:

$$sinc(x) \otimes sinc(x) = \int_{-\infty}^{+\infty} du \left(\frac{\sin u}{u}\right) \frac{\sin[\pi(x-u)]}{\pi(x-u)} = sinc(x)$$

and the result can also be expressed for $f(x)=\sin c^2(x)$:

$$sinc^2(x) \otimes sinc(x) = \int_{-\infty}^{+\infty} du \left(\frac{\sin u}{u}\right)^2 \frac{\sin[\pi(x-u)]}{\pi(x-u)} = sinc^2(x)$$

Fourier's Integral Theorem

According to various embodiments, Fourier's Integral Theorem can provide insight on the convolution form of the convolution integral:

$$\int_0^C dv \cos[2\pi v(x-u)] = \frac{\sin[2c\pi(x-u)]}{\pi(x-u)} = c' sinc[c'(x-u)]$$

with $c'=2c$. The result can be:

$$sinc[(x-u)] = \int_0^{c'} dv \cos\left[\frac{1}{c'}2\pi v(x-u)\right]\Big/c'$$

With a change of integration variable, $v/c' \rightarrow k$, and letting $k \rightarrow \infty$ as $v \rightarrow \infty$, the result becomes:

$$\sin c[(x-u)]=\int_0^{\infty} d\mu \cos [2\pi\mu(x-u)]$$

Substituting this integral into the convolution integral, and interchanging the order of integration shows that convolution integral can be equivalent to:

$$f(x)=\int_{\kappa=0}^{\infty}\int_{-\infty}^{+\infty} du \kappa f(u)\cos [2\pi\kappa(x-u)]$$

which is Fourier's Integral Theorem. Note that Fourier's Integral Theorem can also be derived from the definition of the Fourier transform when $f(x)$ is real. The forward and inverse Fourier transforms are represented as:

$$F(v)=\int_{-\infty}^{+\infty} du f(x)e^{-2\pi vu} \text{ and } f(x)=\int_{-v_b}^{+v_b} dv F_b(v)e^{i2\pi vx}$$

Substituting the value of $f(v)$ into $f(x)$ gives:

$$f(x) = \int_{-\infty}^{+\infty} dv \left[\int_{-\infty}^{+\infty} du f(u) e^{-i2\pi vu}\right] e^{i2\pi vx}$$
$$= \int_{-\infty}^{+\infty} \int_{-\infty}^{+\infty} dv du f(u) e^{i2\pi v(x-u)}.$$

Assuming $f(x)$ is real:

$$f_R(x)=f(x)=\int_{-\infty}^{+\infty}\int_{-\infty}^{+\infty} dv du f(u) \cos [2\pi v(x-u)]$$

but because $\cos [2\pi v(x-u)]$ is even with respect to v, the equation can be written as $$f_R(x)=f(x)=\int_0^{+\infty}\int_{-\infty}^{+\infty} dv du f(u) \cos [2\pi v(x-u)]$$

which is the Fourier Integral Theorem.

Optimal Basis Function Frequency

According to various embodiments, the sampling theorem in abbreviated form can be represented as:

$$f(x) \propto \sum_n f(x_n) \text{sinc}[\alpha u(n)]; \quad u \equiv (n - x/\Delta x)$$

which can help to emphasize another way of looking at the problem, noting that the coefficient $\alpha$ plays the role of a modulating frequency. The coefficient $\alpha$ can determine the spacing for the subsidiary side-lobes of $\sin c(\alpha u)$, for example, the various zeros, maxima, and minima of the sin $c(\alpha u)$ basic functions. The zeros can be given by $$\pi \alpha u(n)=\pi k \Rightarrow u(n)=k/\alpha; \text{ for } k=1,2,3,\ldots$$

As discussed below, if $\alpha \neq 1$, the zeros of sin $c(\alpha u)$ do not coincide with the data sampling interval $\Delta x$.

In some embodiments, $f(x)$ can be a superposition of displaced and weighted sin $c(\alpha u)$ functions, therefore, cancellation of the subsidiary side-lobes at the base of the sin $c(\alpha u)$, can improve interpolation results. To further elaborate, consider an example where Q=4, and for convenience, what is produced is:

$$Q=4; v_b=2 \Rightarrow x_b=1; \Delta x=\frac{1}{8} \Rightarrow v_\Delta=8$$

Figure 3:
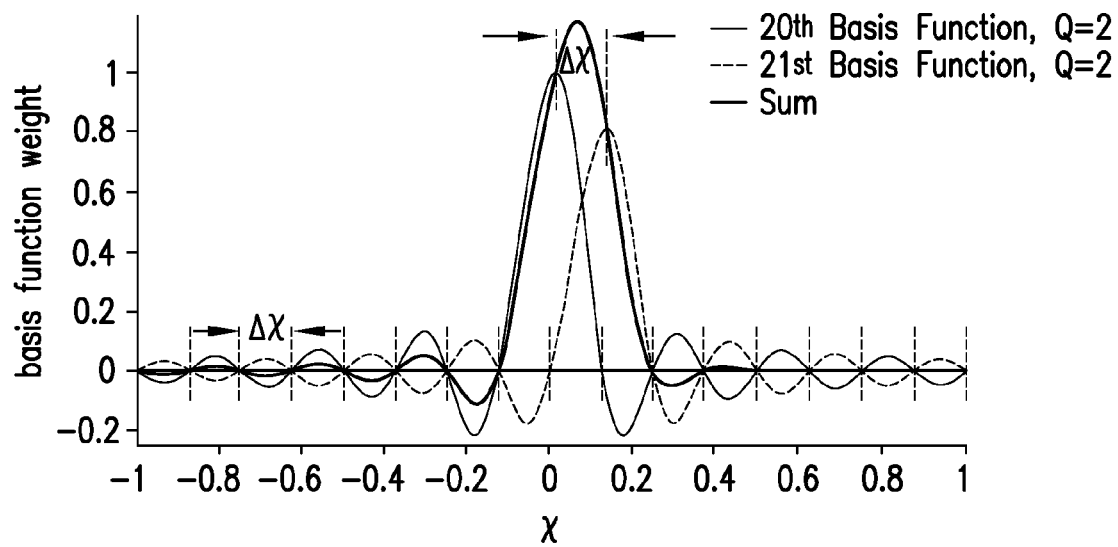
FIG. 3 illustrates neighboring basis functions for Q=2, comprising a rapid decay of the side-lobes, according to various embodiments of the present teachings.

The WSK result corresponds to $\alpha=1$ and the two terms of this example (terms n=20, n+1=21, and N=41) are plotted on a graph and shown in FIG. 3, where it seen that the zeros of the sin $c(\alpha u)$ basis functions correspond to the data sampling interval, $\Delta x$. This means that when shifting the neighboring basis functions over by one data unit to the next, the side-lobe maxima of the n-th basis function corresponds approximately to the side-lobe minima of the (n+1)-th basis function. Therefore, aside from the interpolated value of $f(x)$ at about $(n+\frac{1}{2})$ $\Delta x$, the remaining contribution to the sum of the two basis functions approximately cancels because the side-lobes are out of phase. The sum of the two basis functions can be, for example, as shown in FIG. 3 where the rapid decay of the side-lobes is apparent.

Figure 4:
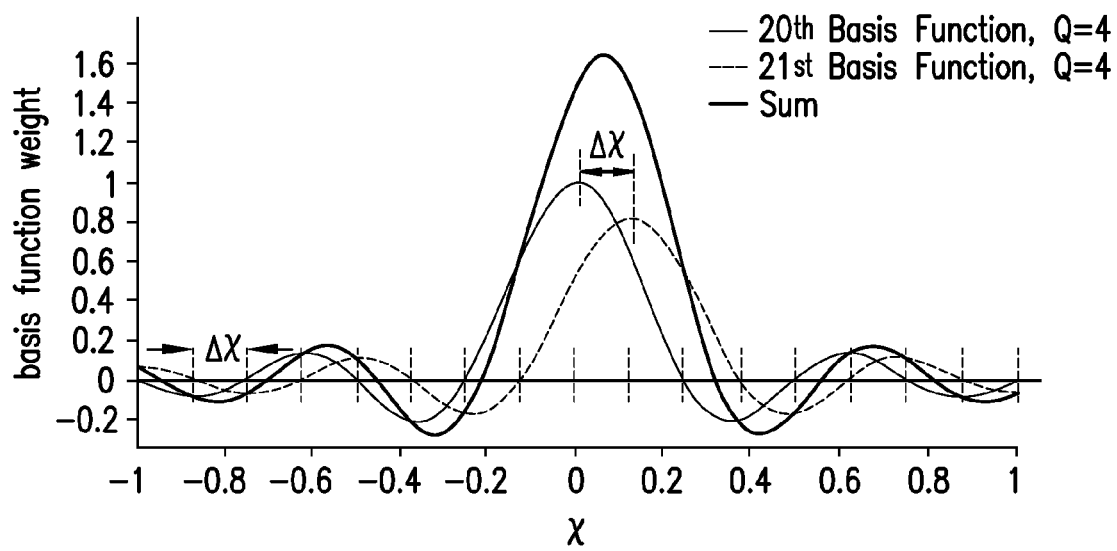
FIG. 4 illustrates neighboring basis functions for Q=4, comprising a rapid decay of the side-lobes, according to various embodiments of the present teachings.

According to various embodiments, by contrast to the WSK result with $\alpha=1$, the WSK(Q) result has $\alpha=\frac{1}{2}$ when Q=4. In this case, the zeros of the sin $c(\alpha u)$ functions are located 2k apart for k given when
$\pi \alpha u(n)=\pi k \Rightarrow u(n)=k/\alpha$; for k=1, 2, 3, . . . therefore, the sin $c(\alpha u)$ zeros go through every other data point. As a result, when shifting the basis function over by one data unit in the interpolation sum, the basis function side-lobes can be approximately "in phase" and little cancellation can occur in the sum. The situation is illustrated in FIG. 4 along with the sum of the two basic functions. As a result, the WSK(Q) result can provide a more efficient method of interpolating the non-uniformly sampled data. The WSK(Q) result can be optimal in cases where the data sampling interval is non-constant, and an optimal superposition of the various neighboring basis function can be achieved by varying the $\alpha$ coefficient in a way that minimizes the subsidiary side-lobes.

Figure 5:
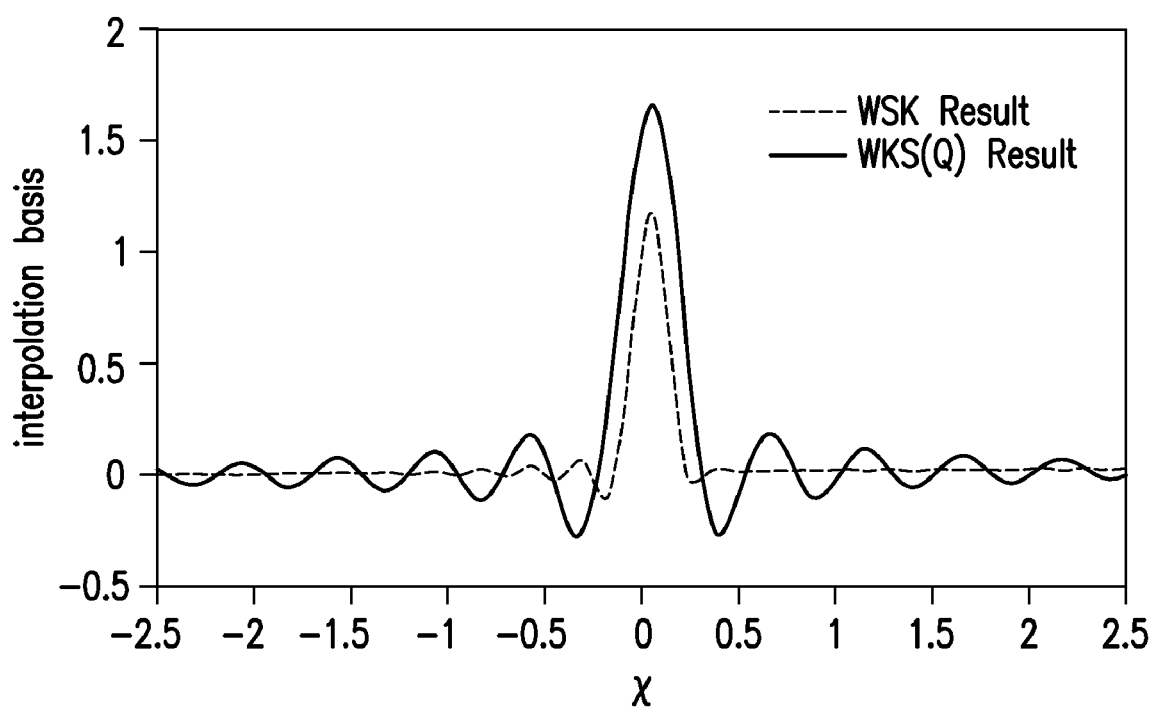
FIG. 5 illustrates the sum of the neighboring basis functions shown in FIG. 4, according to various embodiments of the present teachings.

According to various embodiments, optimally out of phase describes choices of $\alpha$ that minimize ringing in the subsidiary side-lobes because in such cases a better overall interpolation result is obtained. The summation shown in FIG. 5 is of interest from another standpoint: it appears similar in form to the two-lobed Lanczos-windowed sin c function:

$$Lanczos2(\alpha u) = \begin{cases} \text{sinc}(\alpha u)\text{sinc}\left(\frac{1}{2}\alpha u\right), & |x| < 2 \\ 0, & |x| \geq 2. \end{cases}$$

It is clear that a parallel with the windowing analysis is more than just coincidence, and in fact provides additional insight into the WSK interpolation results.

In some embodiments, shifting the sin c(αu) basis functions so that their zeros coincide, can achieve optimal shifting of the sin c(αu) basis functions for u with α=1. For some values of x, this trade is give and take because some ringing in the sum is unavoidable because the locations of the maxima of sin c(αu) vary non-linearly with x. This is because the maxima are solutions to the transcendental equation:

tan(αu)−αu=0.

For $$\alpha u \gg \frac{\pi}{2},$$

the solutions to the above equation can be represented as (which can be verified by plotting tan(αu) and αu):

$$\tan(\alpha u) - \alpha u\big|_{\alpha u \gg \frac{\pi}{2}} = 0 \Rightarrow \alpha u = (2p+1)\frac{\pi}{2}, \quad p = 1, 2, 3, \ldots$$

For smaller values of α u the maxima of sin c(αu) are:

$$\tan(\alpha u) - \alpha u = 0 \Rightarrow \alpha u = (2p+1)\frac{\pi}{2} - \varepsilon(u), \quad p = 1, 2, 3, \ldots$$

where ϵ(u) is a non-linear function that goes to zero for large u.

Other embodiments will be apparent to those skilled in the art from consideration of the present specification and practice of various embodiments disclosed herein. It is intended that the present specification and examples be considered as exemplary only.

What is claimed is:

1. A method for improving image data, the method comprising:
    providing an optical system comprising a signal processor;
    collecting image data generated by the optical system, wherein the image data comprises non-uniformly sampled data;
    performing an interpolation operation on the non-uniformly sampled data using the signal processor, to generate interpolated data, wherein the interpolation operation comprises transforming the non-uniformly sampled data from the spatial domain to the frequency domain by applying the function $$f(x) = \frac{2}{Q} \sum_{n=-\infty}^{+\infty} f(x_n)\text{sinc}\left[\frac{2}{Q}\left(n - \frac{x}{\Delta x}\right)\right],$$

to the non-uniformly sampled data, wherein $f(x)$ is a sampled periodic function, Q is a dimensionless constant for the ratio of a sampling frequency to a band-limited frequency, n is the sampling interval, $$\sum_{n=-\infty}^{+\infty}$$

is the summation from positive infinity to negative infinity and $f(x)_n$ is the value of the periodic function at the sampling interval n;
    adjusting the image data with the interpolated data using the signal processor, to generate improved image data; and
    outputting the improved image data to a user.

2. A method for improving image data, the method comprising:
    providing an optical system comprising a signal processor;
    collecting image data generated by the optical system, wherein the image data comprises non-uniformly sampled data;
    performing an interpolation operation on the non-uniformly sampled data using the signal processor, to generate interpolated data;
    adjusting the image data with the interpolated data using the signal processor, to generate improved image data; and
    outputting the improved image data to a user; wherein the interpolation operation comprises transforming the non-uniformly sampled data from the frequency domain to the spatial domain by applying the function $$F(v) = \frac{2}{Q_v} \sum_{n=-\infty}^{+\infty} F(v_n)\text{sinc}\left[\frac{2}{Q_v}\left(n - \frac{v}{\Delta v}\right)\right]$$

to the non-uniformly sampled data, wherein F(v) is Fourier transform, $Q_v$ is dimensionless constant for the ratio of a sampling interval to a spatial limit, n is the sampling interval, $$\sum_{n=-\infty}^{+\infty}$$

is the summation from positive infinity to negative infinity, and $F(v_n)$ is the value of the Fourier transform at the sampling interval n.

3. The method of claim 1, wherein the outputting the improved image data to a user comprises at least one of displaying the improved image data on a display unit and printing out the improved image data.

4. The method of claim 1, wherein the improved image data comprises improved image resolution data.

5. The method of claim 1, wherein the improved image data comprises at least one of improved image contrast data, improved image brightness data, and improved image focus data.

6. The method of claim 1, wherein the optical system comprises a telescope and the image data is collected from the telescope.

7. An optical system comprising a signal processor and a control unit, the control unit being operably linked to the signal processor, wherein the signal processor is configured to perform a method comprising:
    collecting image data generated by the optical system, wherein the image data comprises non-uniformly sampled data;

performing an interpolation operation on the non-uniformly sampled data using the signal processor, to generate interpolated data, wherein the interpolation operation comprises transforming the non-uniformly sampled data from the spatial domain to the frequency domain by applying the function $$f(x) = \frac{2}{Q} \sum_{n=-\infty}^{+\infty} f(x_n) \operatorname{sinc}\left[\frac{2}{Q}\left(n - \frac{x}{\Delta x}\right)\right]$$

to the non-uniformly sampled data wherein $f(x)$ is a sampled periodic function, Q is a dimensionless constant for the ratio of a sampling frequency to a band-limited frequency, n is the sampling interval, $$\sum_{n=-\infty}^{+\infty}$$

is the summation from positive infinity to negative infinity, and $f(x)_n$ is the value of the periodic function at the sampling interval n;

adjusting the image data with the interpolated data to generate improved image data; and outputting the improved image data to a user.

8. The optical system of claim 7, further comprising a telescope in communication with the control unit, wherein the image data that the signal processor is configured to collect comprises telescope image resolution data.

9. The optical system of claim 7, wherein the image data that the signal processor is configured to collect comprises at least one of image contrast data, image brightness data, and image focus data.

10. The optical system of claim 7, wherein the image data that the signal processor is configured to collect comprises image resolution data.

11. The optical system of claim 7, further comprising a telescope in data-transfer communication with the control unit, wherein the signal processor is configured to collect telescope image data.

* * * * *